Aug. 5, 1924.

R. S. KIRKPATRICK

CASTER CENTERING AND RETAINING DEVICE

Filed June 5, 1922

1,503,535

INVENTOR:
R. S. KIRKPATRICK.
By Earl M. Sinclair
Atty.

Patented Aug. 5, 1924.

1,503,535

UNITED STATES PATENT OFFICE.

ROBERT S. KIRKPATRICK, OF DES MOINES, IOWA, ASSIGNOR TO J. B. LADD, OF DES MOINES, IOWA.

CASTER CENTERING AND RETAINING DEVICE.

Application filed June 5, 1922. Serial No. 565,947.

*To all whom it may concern:*

Be it known that I, ROBERT S. KIRKPATRICK, a citizen of the United States of America, and resident of Des Moines, Polk County, Iowa, have invented a new and useful Caster Centering and Retaining Device, of which the following is a specification.

The object of this invention is to provide improved means for centering and retaining a caster stem in and relative to a hollow portion of an object to be supported, such as the tubular leg of an article of furniture.

A further object of this invention is to provide an improved device adapted to be used in conjunction with a stem caster and having the function of providing a double bearing for swiveling of the caster stem and also retaining the caster stem in a hollow portion of a load object.

My invention consists in the construction, arrangement and combination of elements hereinafter set forth, pointed out in my claims and illustrated by the accompanying drawing, in which—

Figure 1:
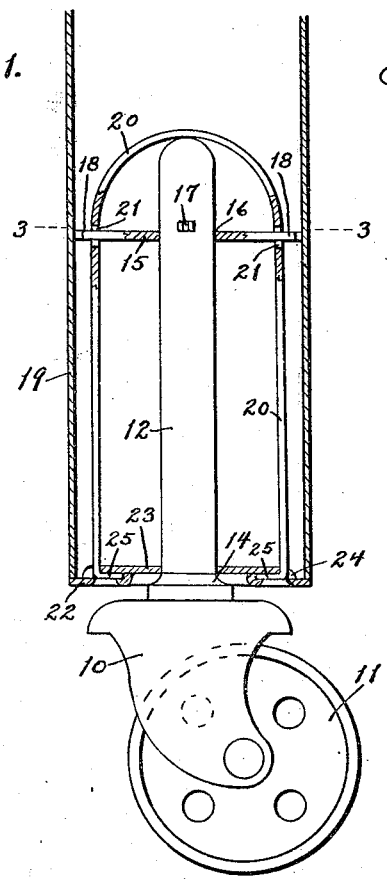
Figure 2:
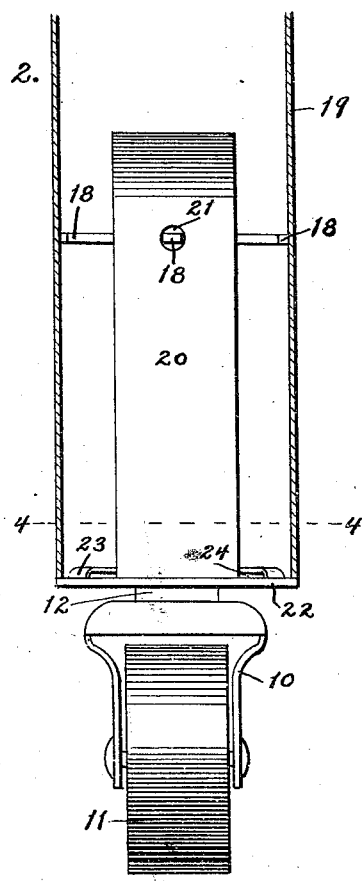
Figure 3:
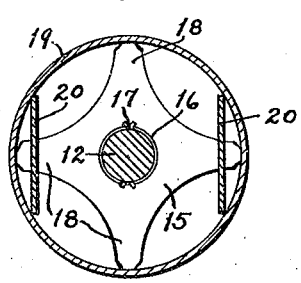
Figure 4:
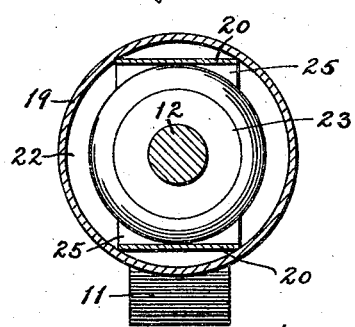

Figure 1 is a side elevation, partly in section, of my improved device in position for practical use, a portion of a load object being shown in section. Figure 2 is a view similar to and at right angles to Figure 1. Figures 3 and 4 are cross-sections on the lines 3—3 of Figure 1 and 4—4 of Figure 2, respectively.

In the construction and application of the invention as shown a caster is shown having a wheel yoke 10, a wheel 11 journaled therein, and a stem 12 fixed to and rising from said wheel yoke, which stem is circular in cross-section and is formed with a shoulder 14 near its lower end just above the top of the wheel yoke. A bearing, spreading and centering plate 15 is provided, which is formed with a central circular hole 16 by means of which it is loosely mounted on the caster stem 12, and said stem is held against downward movement relative to said plate by means of a cotter 17 or other retaining member mounted through the stem above the plate. The plate 15 is formed with a plurality, preferably four, integral, equally spaced, outstanding arms 18 in its own plane, and the tips of said arms are adapted to engage spaced points on the inner periphery of a socket or tubular load member such as the leg 19 of a bed or other article of furniture on which the caster is to be mounted, the plate 15 being arranged in a horizontal plane at a material distance above the open lower end of said object. A spring yoke 20 is provided, of inverted U-shape, and is adapted to embrace the stem 12 and the plate 15, the arms of said yoke being formed near their upper or closed ends with apertures 21 to receive loosely two of the arms 18 of said plate. A lower bearing disk 22 is provided, which is formed with a central opening providing a bearing for the lower end portion of the caster stem 12. The bearing disk 22 rests just above the shoulder 14 of the caster stem, and is adapted to engage and close the lower end of the leg 19 or other similar socket member of the load object; and where such object is a tubular leg the disk 22 preferably is fitted and corresponds in diameter thereto, as shown. The disk 22 preferably is formed of metal by pressing and stamping, and is formed with a central raised boss 23 of relatively large diameter, diametrically opposite portions of said boss being formed with horizontal slots 24 which receive inturned end portions or flanges 25 of the lower ends of the arms of the spring yoke 20. Thus the members of the attachment, comprising the yoke, plate 15 and disk 22 are retained in their proper relations, and when the stem 12 of the caster is mounted therein and the pin 17 applied above the plate 15, said caster is held by and relative to the device and is furnished with spaced bearings, by means of the plate 15 and disk 22, for swiveling of its stem on a vertical axis. Furthermore the upper end of the stem 12 is pointed or rounded to semi-spherical form and engages the arcuate lower surface of the closed portion of the yoke 20, providing a step bearing for the upper end of said stem, and a means for supporting the load object on and axially of the stem of the caster.

The device is adapted to be mounted in the leg 19 or other socket portion of the load object, which rests on the disk 22 of the device, the weight being transferred through said plate and the yoke 20 to the stem of the caster. The arms of the yoke 20 fit snugly and are held by frictional contact in the socket member or leg 19, being arranged tangentially on opposite sides of the center of said leg and each engaging at its edges with the interior wall of the same. The tips of the arms 18 of the plate 15 engage the walls of the leg at a point considerably above the lower end of the stem, and prevent tipping of the stem relative to the load and also holding the stem in proper centered relation. Those arms of the plate 15 which engage the arms of the spring yoke also serve to spread and prevent inward movement of the upper portions of said yoke arms.

The device is easily and quickly applied and removed and the caster is held in its true position and provided with spaced bearings, so that it does not tip, bind or jamb in use and perfect swiveling function is assured. This swiveling function is greatly facilitated by the end bearing of the yoke 20, which carries the load through the disk 22, on the upper end of the caster stem.

The spring construction of the yoke 20 makes it adjustable and adaptable to tubular objects of varying diameter, and also to socket openings that are irregular in cross-section or other than circular.

I claim as my invention—

1. The combination with a load object having a cylindrical opening and a caster having a stem of less diameter than said opening, of a centering and retaining device comprising a disk pivotally mounted on said stem and engaging the lower surface of said load object, a spring yoke carried by said disk and embracing said stem and having its closed end resting on the upper end of said stem, said yoke having frictional contact with the walls of said opening, a bearing and spreading plate carried by said yoke and pivoted on said stem at a considerable distance above said disk, and means connected with said stem above said plate to prevent downward movement of said stem relative to said plate.

2. The combination with a load object having a cylindrical opening and a caster having a stem of less diameter than said opening, of a centering and retaining device comprising a disk pivotally mounted on said stem and adapted to engage the lower surface of said load object, a yoke mounted with its arms in engagement with said disk and embracing said stem, said yoke having its closed end supported by the upper end of said stem which upper end is reduced in diameter, a bearing plate carried by said yoke at a considerable distance above said disk, and a pin mounted through said stem above said plate.

3. The combination with a load object having a downwardly opening socket and a caster having a stem of less diameter than said socket, of a centering and retaining device comprising a disk pivotally mounted on said stem and adapted to engage the lower end of said load object, said disk being formed with a centrally raised boss having diametrically opposed marginal slots, and a one-piece spring yoke arranged with its closed end resting on and supported by the upper end of the caster stem, the lower ends of the arms of said yoke being turned inwardly and extending in supporting relation and yet movably through the slots of said disk, the inturned ends of said yoke arms being radially movable in a plane between the body and boss of said disk.

Signed at Des Moines, in the county of Polk and State of Iowa, this 1st day of June, 1922.

ROBERT S. KIRKPATRICK.